(12) United States Patent
Di Cairano

(10) Patent No.: US 9,073,569 B2
(45) Date of Patent: Jul. 7, 2015

(54) DETERMINING STEERING ANGLE OF STEERING COLUMN OF VEHICLE

(71) Applicant: Stefano Di Cairano, Somerville, MA (US)

(72) Inventor: Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/847,129

(22) Filed: Mar. 19, 2013

(65) Prior Publication Data

US 2014/0288779 A1    Sep. 25, 2014

(51) Int. Cl.
*B62D 15/02* (2006.01)
*B62D 5/04* (2006.01)

(52) U.S. Cl.
CPC .......... *B62D 5/0481* (2013.01); *B62D 15/0235* (2013.01); *B62D 15/0245* (2013.01)

(58) Field of Classification Search
CPC ............ B62D 15/021; B62D 15/0215; B62D 15/022; B62D 15/0225; B62D 15/023; B62D 15/0235; B62D 15/024
See application file for complete search history.

(56) References Cited

U.S. PATENT DOCUMENTS

| 5,465,210 | A | 11/1995 | Walenty | |
|---|---|---|---|---|
| 6,089,344 | A | 7/2000 | Baughn et al. | |
| 6,459,971 | B1 | 10/2002 | Kurshige et al. | |
| 6,816,799 | B2 * | 11/2004 | Yu et al. | 702/94 |
| 7,500,538 | B2 * | 3/2009 | Hara et al. | 180/412 |
| 8,280,591 | B2 * | 10/2012 | Serarslan et al. | 701/42 |
| 8,322,484 | B2 * | 12/2012 | Lee | 180/444 |
| 8,375,779 | B2 * | 2/2013 | Pattok et al. | 73/117.02 |
| 8,428,822 | B2 * | 4/2013 | Shartle et al. | 701/41 |
| 8,509,994 | B2 * | 8/2013 | Koukes et al. | 701/42 |
| 8,571,758 | B2 * | 10/2013 | Klier et al. | 701/41 |
| 8,712,646 | B2 * | 4/2014 | Michelis et al. | 701/42 |
| 2006/0247838 | A1 * | 11/2006 | Bauer | 701/41 |
| 2009/0043443 | A1 * | 2/2009 | Wei et al. | 701/29 |
| 2009/0125187 | A1 | 5/2009 | Yamamoto et al. | |
| 2010/0235052 | A1 | 9/2010 | Shartle et al. | |
| 2012/0197494 | A1 * | 8/2012 | Biegert | 701/42 |

FOREIGN PATENT DOCUMENTS

DE    2008063567 A1    4/2010

* cited by examiner

*Primary Examiner* — John R Olszewski
*Assistant Examiner* — Todd Melton
(74) *Attorney, Agent, or Firm* — Dirk Brinkman; Gene Vinokur

(57) ABSTRACT

A system and a method determine a steering angle of a steering column of a vehicle as a sum of a shifted steering angle and an offset. The steering angle is updated by adjusting the offset in response to detecting incoherence between the steering angle and a lateral vehicle dynamic.

20 Claims, 12 Drawing Sheets

DETERMINING STEERING ANGLE OF STEERING COLUMN OF VEHICLE

FIELD OF THE INVENTION

This invention relates generally to an, electric power steering system of a vehicle, and more particularly to determining a steering angle of a steering column of a vehicle.

BACKGROUND OF THE INVENTION

A steering angle of a steering column of a vehicle can be used for controlling steering systems, suspension systems, and braking systems. Typically, steering, sensors are used for measuring the steering angle. The steering sensors are installed and calibrated at the time the vehicle is manufactured. However, the re-calibration of the steering sensors is needed whenever the steering system geometry is changed due to the operation of the vehicle.

Some conventional methods determine steering angle by detecting straight motion of the vehicle and adjusting the steering offset of the steering sensor during that straight motion. See, e.g., U.S. 2010/235,052 U.S. Pat. No. 5,465,210 or U.S. 2009/0125187. However, it is not always possible to accurately detect the straight movement of the vehicle due to the curvature of the surface of the road. Also, there may be relatively few periods when the vehicle is actually di mg perfectly straight and hence significant time may pass before the determination occurs. Accordingly, there is a need for accurate determination of the steering angle without relying on the straight motion of the vehicle.

Some methods calibrate the steering sensor based on detailed models of the vehicle dynamics. See, e.g., U.S. Pat. No. 6,775,604 or U.S. Pat. No. 6,498,971. However, these models require knowledge of the road friction and various vehicle parameters, such as mass, inertia, tire stiffness, weight distribution, and suspension angles. Such knowledge is difficult and almost impossible to obtain during an operation of the vehicle. Also, the models change over the time due to wear of the tires and changes in the vehicle mass.

Accordingly, there is a need in the art to determine the steering angle during the operation of the vehicle, it is also desired to determine the steering angle when the vehicle experiences the lateral motion. It is also desired to determine the steering angle without the use of detailed vehicle models.

SUMMARY OF THE INVENTION

One objective of embodiments of the invention is to determine a steering angle of a steering column of a vehicle during operation of the vehicle. Some embodiments determine the steering angle without a steering angle sensor. In some embodiments, the usage of the steering angle sensor is avoided. Alternative embodiments determine the steering angle to adjust or calibrate the steering angle sensor or to monitor possible faults in the steering angle sensors and/or vehicle sensors.

Various embodiments of the invention are based on an observation that sometimes it is possible to represent the steering angle as a sum of a shifted steering angle and an offset. In some situations, the shifted steering angle is easier to determine or directly measure. In addition, the steering angle can be updated by adjusting the offset in response to detecting incoherence between the steering angle and a lateral vehicle dynamic. Accordingly, it is possible to determine the steering angle to minimize or to avoid the need for the steering angle sensor.

For example, some embodiments of the invention are based on a realization that some parameters of operation related to the steering angle are also measured by sensors of electric power steering system (EPS). This introduces redundancy of sensors that can be used to monitor the state of the steering system. Thus, measurements of the sensors of the EPS can be used to determine the steering angle.

For example, the steering angle is a function of an angle of a steering motor of the EPS, such that the angle of a steering motor is the shifted steering angle. Thus, the angle of the steering motor can be used to determine the steering angle of the steering column. Such determination can be advantageous, because the steering, motor of the EPS is less influenced by the operation of the vehicle than the steering column, and thus the EPS can preserve the accuracy of the measurements for a longer period of time.

Alternative embodiments are based on a realization that the shifted steering angle can be measured with a relative encoder, rather than an absolute encoder. Relative encoders are simpler to construct and smaller, thus cheaper and easier to package, than the absolute encoders. However, in the relative encoders, only the relative position, i.e., an angle with respect to an unknown steering angle is measured.

In addition, some embodiments are based on recognition that a value of the steering angle can be determined in a presence of an error. For example, the steering angle can be measured by an absolute encoder, but a constant error is present due to imprecision in the mounting of the encoder in the vehicle. Also, an effective steering wheel angle can be shifted by the offset due to errors and/or failures in the actuator in an active front steering system.

The offset is generally unknown. However, the offset can be determined during the operation of the vehicle using at least one of the vehicle dynamics influenced by the steering angle. The steering angle can influence lateral dynamics, such as a yaw rate, a lateral acceleration of the vehicle, a torque of the steering wheel, a steering torque, and the rotational speed of each of the wheels of the vehicle. Notably, the usage of the lateral dynamics does not require detecting the straight movement of the vehicle.

Specifically, the steering angle signal is coherent to a signal representing the lateral vehicle dynamic in a certain frequency bandwidth of the vehicle dynamic. Hence, the steering angle can be determined as a function of the angle of the motor, such that the signal of the steering angle is coherent with the signal of the lateral vehicle dynamic in a certain frequency bandwidth.

Two signals are coherent, if their values at any point in time have the same sign. If the sign is the same, the product of the two signals is always zero or positive (i.e., nonnegative). Thus, some embodiments detect incoherence when the product of the steering angle and the lateral vehicle dynamic is negative.

When the product is negative, some embodiments adjust the offset to make such product zero. The procedure is repeated until no incoherence is detected. For example, the offset can be initialized to a predetermined positive value to detect incoherence. Next, the offset is modified at each iteration until a termination condition is met.

One embodiment adjusts the offset based on signals of the dynamics of the vehicle. This embodiment guarantees that a maximal estimation error is not greater than the maximal estimation error obtained from a single sensor. For example, one embodiment initializes the steering angle, determines estimations of the steering angle, each estimation is coherent with one signal of dynamics of the vehicle, and adjusts the steering angle as a weighted average of the plurality of estimations of steering angle. Also, in this embodiment, the errors due to external unpredictable factors affecting different vehicle dynamics in different ways are reduced.

One embodiment determines the steering angle separately for anticlockwise (left) and clockwise (right) turns of the steering wheel, and determines the steering angle as an average of the left and right estimations of the steering angle. This reduces errors due to external factors and higher frequency in the vehicle dynamics.

In some embodiments, the steering angle is determined to have converged when difference of the current offset estimate and the time-averaged offset estimate, and the offset variance are less than two predefined thresholds related to the desired offset estimation precision. When such a condition is verified, the offset is stored in a memory and maintained constant until the permanent power source of the vehicle electrical system is providing power to the vehicle electrical system.

In some embodiments the difference between the average of the offset over time and the current offset, and/or the variance of the offset, and/or the difference from the estimates between left and right turns, and/or the difference of the estimates obtained from different sensors is used to provide a score related to an uncertainty of the current estimate of the offset and the steering angle.

Accordingly, one embodiment of the invention discloses a method for determining a steering angle of a steering column of a vehicle. The method includes determining the steering angle as a sum of a shifted steering angle and an offset; and updating the steering angle by adjusting the offset in response to detecting an incoherence between the steering angle and a lateral vehicle dynamic. Steps of the method are performed by a processor.

For example, the lateral vehicle dynamic can include, at least one of a yaw rate, a lateral acceleration, a steering alignment torque, a steering torque, and a rotational speed of at least one wheel of the vehicle. The shifted steering angle can include at least one of an angle of a steering motor, a relative angle measured with respect to the steering angle, a value of the steering angle determined in a presence of an error, and an effective steering wheel angle shifted by the offset.

Another embodiment discloses a system for determining a steering angle of a steering column of a vehicle. The system includes a processor for determining the steering angle as a sum of a shifted steering angle and an offset; and updating the steering angle by adjusting the offset in response to detecting an incoherence between the steering angle and a lateral vehicle dynamic.

Yet another embodiment discloses a motor vehicle having electric power steering system (EPS). The motor vehicle includes at least one sensor for measuring at least one lateral vehicle dynamic of the motor vehicle; a sensor for measuring a signal representing a shifted steering angle; and a processor for determining a steering angle of a steering column of the motor vehicle as a sum of a shifted steering angle and an offset, and for adjusting iteratively the steering angle in response to detecting, an incoherence between the steering angle and the lateral vehicle dynamic.

DETAILED DESCRIPTION OF THE PREFERRED EMBODIMENTS

Overview of Motor Vehicle Steering System

Figure 1:
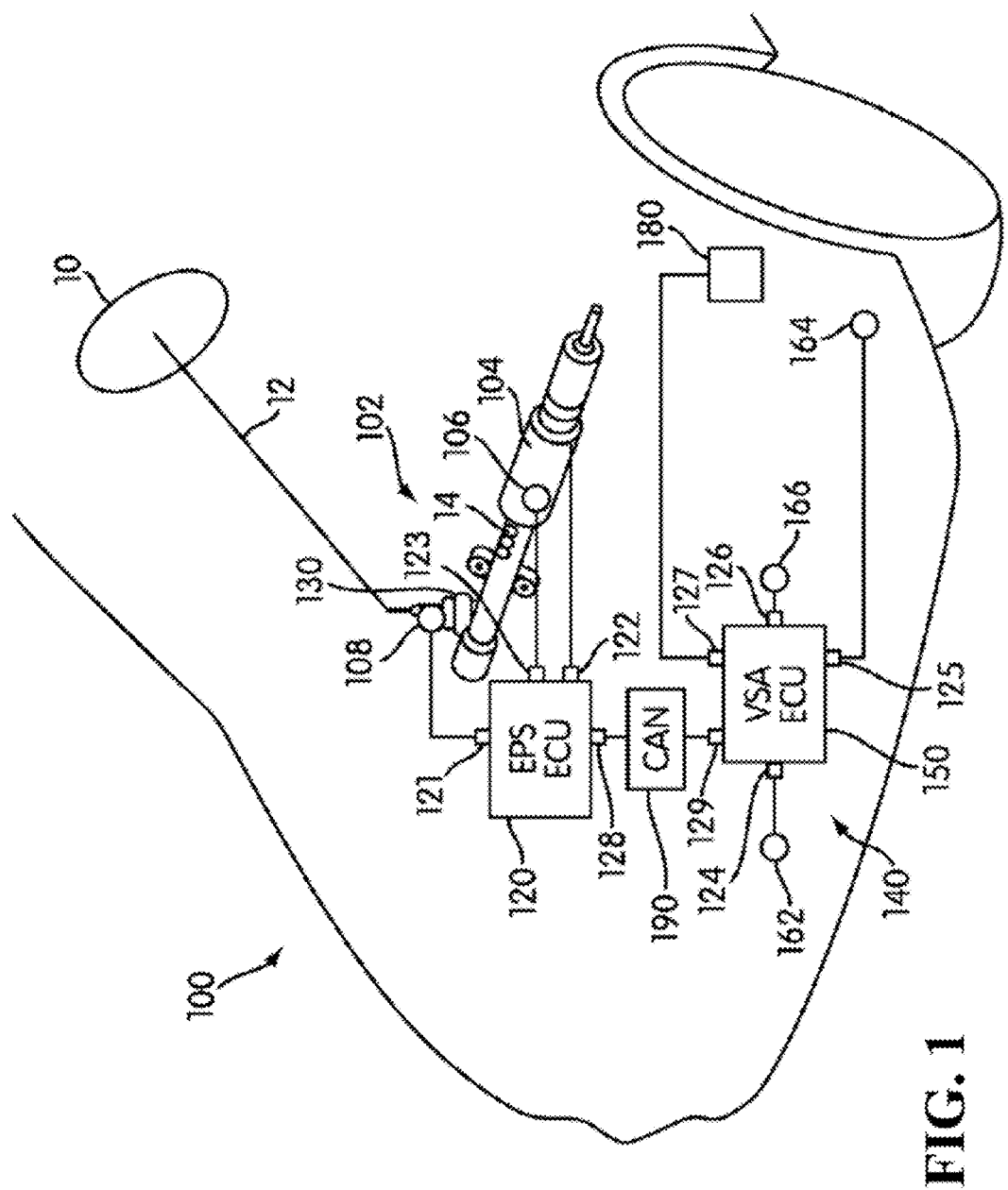
FIG. 1 is a schematic view of an embodiment of a motor vehicle steering, system according to one embodiment of the invention.

FIG. 1 is a schematic view of an embodiment of motor vehicle steering system 100. The term "vehicle" or "motor vehicle" as used throughout the specification and claims refers to any moving vehicle that is capable of carrying one or more human occupants and is powered by any form of energy. The term "vehicle" or "motor vehicle" includes, but is not limited to: cars, trucks, vans, minivans, SUVs, motorcycles, scooters, boats, personal watercraft, and aircraft in some cases, the motor vehicle includes one or more engines. The term "engine" as used throughout the specification and claims refers to any device or machine that is capable of converting energy.

For purposes of illustration, some components of motor vehicle 100 are shown schematically. In one embodiment, the motor vehicle 100 can include steering wheel 10 that is further connected to steering column 12. The steering column 12 can be connected to a rack 14, which can be further connected to the front wheels of motor vehicle 100 using tie rods.

The motor vehicle 100 can include a power steering system 102. The power steering system 102 can be any system designed to reduce the steering effort used by a driver to turn or steer a motor vehicle. In some cases, power steering system 102 can be a hydraulic type power steering system. In other cases, power steering system 102 can be an electric power steering system. In an exemplary embodiment, power steering system 102 can be an electric power steering system (EPS) that uses an electric motor to provide assistance in turning or steering a turning motor vehicle.

Power steering system 102 can include a gearbox 130. Gearbox can be any type of gearbox known in the art. In some embodiments of power steering, system 102, gearbox 130 can be of a rack-and-pinion type. In some embodiments of power steering system 102, gearbox 130 can be of a dual pinion type. In some embodiments, gearbox can be of a recirculating ball-and-rack type.

FIG. 1 shows an embodiment having a rack-and-pinion, gearbox. The function of gearbox 130 can be to allow a turn of steering wheel 10 to turn motor vehicle 100. Steering wheel 10 turns in circles. The turn of the steering wheel 10 creates an angular force in steering column 12. In some motor vehicles 100 this angular force can be redirected to turn the vehicle. In some embodiments, the angular force can be redirected into a sideways motion (lateral motion) of rack 14. Gearbox 130 can be a combination of gears that redirect the angular force from steering column 12 to a lateral force in rack 14.

Power steering system 102 can include provisions for assisting; a driver in turning a motor vehicle. In one embodiment, power steering system 102 can include a steering motor 104. Generally, steering motor 104 can be any type of motor. In an exemplary embodiment, steering motor 104 can be an electric motor that is configured to drive one or more components of a motor vehicle to assist in turning the motor vehicle.

Steering motor 104 can be arranged in various locations within motor vehicle 100. Steering motor 104 can be disposed proximate a steering column 12. Steering motor can be disposed proximate a gear of gearbox 130. As shown in FIG. 1, steering motor 104 can be installed concentrically around rack 14 to provide assistance in moving the rack 14 to the left or to the right. In other embodiments using different types of steering systems, the steering motor 104 can be provided in various locations to provide assistance in turning the motor vehicle.

Power steering system 102 can include provisions for monitoring the rotation of steering column 12. In some cases, power steering system 102 can include a position sensor that is configured to monitor the absolute position of steering column 12. In other cases, power steering system 102 can include a rotation sensor of some kind that is configured to directly monitor the rotation of steering column 12. In embodiments using the steering motor 104 to help assist with turning, power steering, system 102 can include a sensor configured to measure the angular rotation of the motor. Because the rotation of a motor in a power steering system is typically related to the rotation of a steering column by a fixed year ratio, a measurement of the rotation of the motor can be related directly to a measurement of the rotation of the steering column.

In some embodiments, the power steering system 102 can include rotation sensor 106. Generally, the rotation sensor 106 can be any type of sensor configured to detect the rotation of steering motor 104. For example, in one embodiment, a plurality of Hall effect sensors can be associated with steering motor 104 to measure movements of a rotor. In some embodiments, a resolver or rotary electrical transformer can be used for detecting the rotations of a rotor within steering motor 104. In still other embodiments, other types of sensors can be used for detecting the rotation of steering motor 104.

Rotation sensor 106 can be arranged at various locations in the power steering system 102. The power steering system 102 can employ different types of gearboxes 130. Each type of gearbox 130 can position gears in different locations. Steering motor 104 and various sensors can be positioned in different locations based on the type of gearbox 130. For example, rotation sensor 106 can be positioned depending on many factors, including but not limited to the placement of gears, the type of gearbox 130, the type of steering motor 104, the placement of steering motor 104, and other factors.

Power steering system 102 can also include provisions for detecting torque applied by a driver to a steering system. In one embodiment, power steering system 102 can include steering torque sensor 108. In some cases, steering torque sensor 108 can be associated with gearbox 130. In other cases, however, steering torque sensor 108 can be provided at any other location of a steering system. Using this arrangement, a power steering system can determine the amount of steering assistance that can be required.

Motor vehicle 100 can include provisions for communicating, and in some cases controlling, the various components associated with power steering system 102. In some embodiments, motor vehicle 100 can be associated with a computer or similar device. In the current embodiment, motor vehicle 100 is associated with a power steering system electronic control unit, hereby referred to as first Electronic Control Unit (first ECU) 120. In one embodiment, first ECU 120 can be configured to communicate with, and/or control, steering motor 104, rotation sensor 106 and steering torque sensor 108 as well as other components or systems.

The first ECU 120 can include a number of ports that facilitate the input and output of information and power. The term "port" as used herein refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering of electron traces on circuit boards.

All of the following ports and provisions associated with first ECU 120 are optional. Some embodiments can include a given port or provision, while others can exclude it. The following description discloses many of the possible ports and provisions that can be used, however, it should be kept in mind that not every port or provision must be used or included in a given, embodiment.

In one embodiment, the first ECU 120 can include first port 121 for communicating with steering torque sensor 108, the second port 122 for communicating with the steering motor 104 and the third port 123 for communicating with rotation sensor 106. In particular, using the first poll 121, the first ECU 120 can receive information from the steering torque sensor 108 related to the torque applied to the steering column 12. With this information, the first ECU 120 can determine how much steering assistance is required and send a control signal to the steering motor 104, using the second port 122 to operate the steering motor 104 in a manner that provides the required steering assistance. In addition, the first ECU 120 can receive information from the rotation sensor 106 via the third port 123 about the rotation of the steering motor 104, which can be used to further determine the rotation of the steering column 12.

Motor vehicle 100 can include provisions for providing vehicle stability assistance during driving. In an exemplary embodiment, the motor vehicle 100 can include a vehicle stability assist system 140 (VSA). The vehicle stability assist system 140 can be any electric stability control system that is capable of modifying the operation of the vehicle by detecting and preventing undesirable motions such as skidding. In particular, vehicle stability assist system 140 can be configured to detect loss of steering control and provide individual braking at different wheels to help redirect a vehicle.

A vehicle stability assist system 140 can be associated with one or more sensors configured to receive information related to operating conditions of the vehicle 100. In some embodiments, motor vehicle 100 can include acceleration sensor 162. Generally, acceleration sensor 162 can be any type of acceleration sensor, in one embodiment, acceleration sensor 162 can be a gyroscopic sensor configured to receive information related to a yaw rate of a vehicle and/or lateral acceleration information. Although a single sensor can be used in the current embodiment for detecting yaw rate and lateral acceleration, in other embodiments more than one sensor can be used with a motor vehicle.

Acceleration sensor 162 can be positioned in various locations within motor vehicle 100. The location of acceleration sensor 162 can be influenced by the type of gearbox 130, as well as other factors known to those in the art. For example, the other factors can include a type of engine in motor vehicle 100 and a type of train. In some embodiments, acceleration sensor 162 can be located within a vehicle stability assist system electronic control unit.

In one embodiment, the motor vehicle 100 can include set of wheel speed sensors 164. In some cases, the set of wheel speed sensors 164 can comprise a set of four independent wheel speed sensors associated with the four wheels of motor vehicle 100. In particular, each wheel speed sensor of set of wheel speed sensors 164 can be configured to detect the speed of a corresponding wheel of motor vehicle 100. Using this information, vehicle stability assist system 140 can detect variations in wheel speed over each of the tour wheels of motor vehicle 100 for detecting slipping, skidding, or other undesirable vehicle motions. Furthermore, while four wheel speed sensors can be used in an exemplary embodiment, other embodiments can include any other number of wheel speed sensors. In an alternative embodiment including a vehicle with more than four wheels, for example, more than four wheel speed sensors can be provided on the motor vehicle.

The wheel speed sensor 164 can be placed in various locations within the motor vehicle 100. The location of the wheel speed sensor 164 can be influenced by many factors including, but not limited to, the type of drive train employed by the motor vehicle and the configuration of the braking system. In some embodiments, the wheel speed sensor 164 can communicate with first ECU 120.

In some embodiments, motor vehicle 100 can include vehicle speed sensor 166, in some cases, vehicle speed sensor 166 can be a vehicle speed pulse sensor associated with a transmission of motor vehicle 100. In other cases, vehicle speed sensor 166 can be any other type of sensor configured to provide vehicle speed information to one or more systems of motor vehicle 100. By monitoring information received from vehicle speed sensor 166, vehicle stability assist system 140 can be configured to detect abnormal operating conditions of the motor vehicle.

The motor vehicle 100 can include provisions for communicating, and in some cases controlling, the various components associated with vehicle steering assist system 140. In some embodiments, motor vehicle 100 can be associated with a computer or similar device. In the current embodiment, the motor vehicle 100 can be associated with the vehicle stability assist system electronic control unit, hereby referred to as second ECU 150. In one embodiment, the second ECU 150 can be configured to communicate with, and/or control various sensors and systems of motor vehicle 100 that are utilized in the operating vehicle stability assist system 140.

The second ECU 150 can include a number of ports that facilitate the input and output of information and power. In one embodiment, second ECU 0.150 can include fourth port 124 for communicating with acceleration sensor 162. In particular, second ECU 150 can be configured to receive information related to a yaw rate of motor vehicle 100 from acceleration sensor 162. In addition, second ECU 150 can be configured to receive lateral acceleration information related to motor vehicle 100 from acceleration sensor 162. Also, second ECU 150 can include fifth port 125 for communicating with set of wheel speed sensors 164, in particular, second. ECU 150 can be configured to receive information about the speeds of one or more wheels of motor vehicle 100. Also, second ECU 150 can include sixth port 126 for communicating with vehicle speed sensor 166. In particular, second ECU 150 can be configured to receive vehicle speed pulse information associated with a transmission of motor vehicle 100. With this arrangement, second ECU 150 can be configured to determine various operating conditions of motor vehicle 100 to determine if motor vehicle 100 is skidding or sliding.

The vehicle stability assist system 140 can also include provisions for controlling one or more systems of a motor vehicle in order to provide stability control. In some embodiments, second ECU 150 can include seventh port 127 for communicating with braking system 180. For example, in some cases, upon detecting a skidding condition of a Motor vehicle, second ECU 150 can send control signals to breaking system 180 to apply individual breaking to the wheels of motor vehicle 100 in order to stabilize the driving conditions and reduce skidding, in other embodiments, vehicle stability assist system 140 can be associated with additional systems of a motor vehicle for assisting in controlling a motor vehicle during skidding or other undesired operating conditions. For example, in another embodiment, second ECU 150 could be configured to control an engine in a manner that reduces power during situations where steering control fails.

The motor vehicle 100 can include provisions for providing communication between various systems. In one embodiment, motor vehicle 100 can include provisions for providing communication between power steering system 102 and vehicle stability assist system 140. In some cases, motor vehicle 100 can include vehicle controller area network 190. In some cases, vehicle controller area network 190 can provide communication between any systems of a motor vehicle utilizing some type of electronic control unit. In an exemplary embodiment, vehicle controller area network 190 is configured to provide communication between power steering system 102 and vehicle stability assist system 140. In particular, first ECU 120 of power steering system 102 can communicate with vehicle controller area network 190 using eighth port 128, while second ECU 150 of vehicle stability assist system 140 can communicate with vehicle controller area network using ninth port 129.

A motor vehicle can include provisions for determining the steering angle for use in one or more subsystems. For example, a vehicle stability assist system can require a steering angle for purposes of comparing the actual vehicle motion (as measured by various sensors) with the intended motion of the driver (as measured by steering angle).

Steering Angle Determination

Various embodiments of the invention are based on an observation that sometimes it is possible to represent the steering angle as a sum of a shifted steering angle and an offset. In some situations, the shifted steering angle is easier to determine or directly measure. In addition, the steering angle can be updated by adjusting the offset in response to detecting incoherence between the steering angle and a lateral vehicle dynamic.

For example, some embodiments of the invention are based on a realization that some parameters of operation related to the steering wheel angle are also measured by sensors of electronic power steering system (EPS) which are not available in classical hydraulic power steering systems. Specifically, the steering angle is a function of an angle of a steering motor 104 of the EPS 102. Thus, the measurements of the angle of the steering motor can be used to determine the steering angle. Such determination can be advantageous, because the motor of the EPS is less influenced by the operation of the vehicle than the steering column, and thus can preserve the accuracy of the measurements for a longer period of time.

One embodiment determines the steering angle based on a sum of the angle of the steering motor and an offset. For example, the steering angle is related to the angle of the steering motor according to $$SWA(t) = SWA(0) + \int_0^t \frac{d}{d\tau} SWA(\tau) d\tau, \qquad (1)$$

$$SWA(0) + \int_0^t \frac{d}{d\tau} EMA(\tau) d\tau =$$

$$SWA(0) - EMA(0) + EMA(t) = EMA(t) + O,$$

wherein SWA(t) is the steering angle as a function of time t, EMA(t) is a signal representing the angle of the steering motor as a function of time, O is the time independent offset, which is equal to the difference between EMA and SWA at time t=0.

The offset is constant as long as the memory of the motor vehicle is not cleared, but is generally unknown. The memory is cleared only when the primary energy storage of the vehicle electrical system (usually a battery unplugged, for instance when the vehicle is serviced. Various embodiments of the invention determine the offset during the operation of the vehicle using at least one of the dynamics of the vehicle such as a yaw rate, a lateral acceleration of the vehicle, and a torque of the steering wheel.

Various sensors, such as the yaw rate sensor, the lateral acceleration sensor, the wheel speed sensors, and the steering wheel torque sensor synchronously measure quantities of the vehicle dynamics. The measurements of the sensors can be read by any vehicle ECU and made available to the first ECU (EPS ECU) through a wired port or network link (CAN), as described in connection with FIG. 1. Additionally or alternatively, the VS can be determined from other measurements. For example, yaw rate can be determined from the difference of wheel speeds. The steering alignment torque can be determined from the steering torque sensed by an appropriate sensor connected to the EPS ECU, EMA velocity, and friction characteristics of the EPS motor.

Some embodiments of the invention are based on the realization that certain vehicle dynamics values (VS) obtained by filtering the measurement signals obtained by the sensors, are coherent with the correct steering angle values, where in this context two values are coherent if they have the same sign. On the other hand if the steering angle value is incorrect, for instance due to an incorrect value of the offset, then the incoherence can occur.

Figure 2:
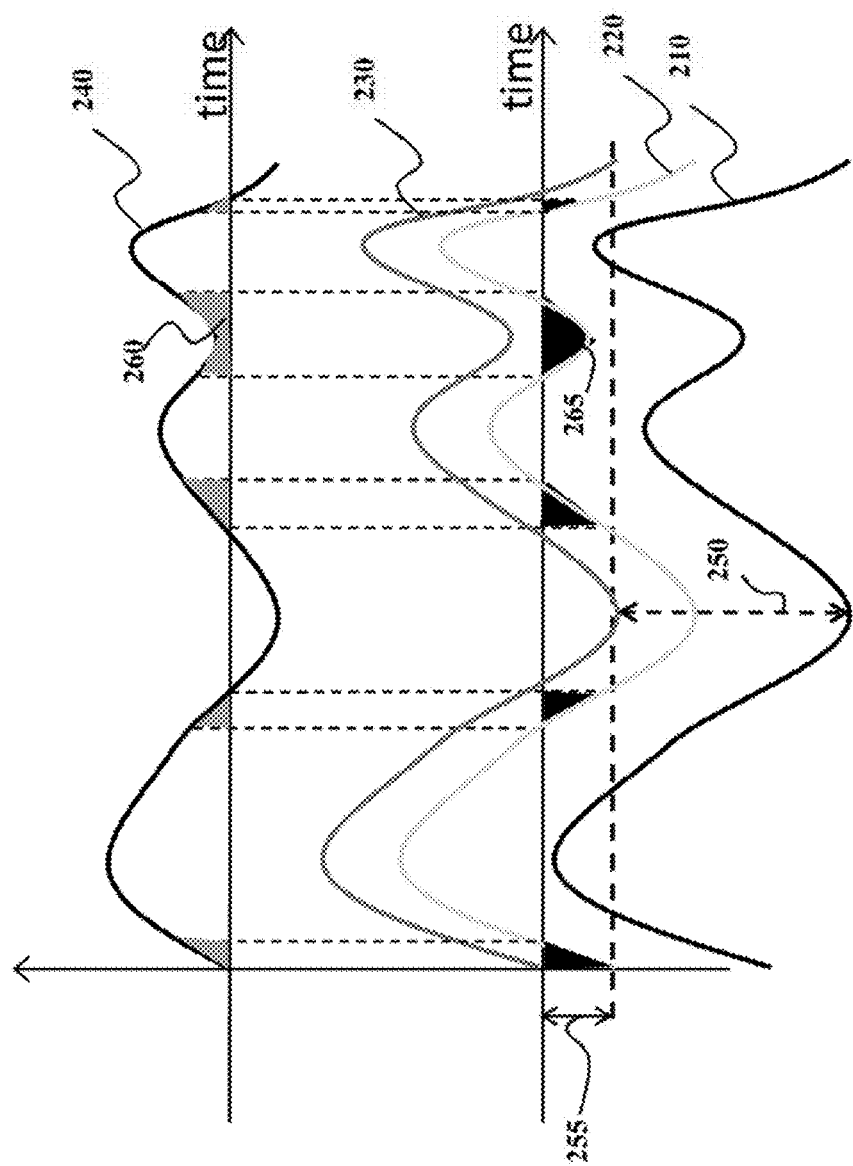
FIG. 2 is a timing diagram of signals used by some embodiments of the invention.

FIG. 2 shows a timing diagram illustrating that realization. The signal 210 is a EMA(t) signal representing the shifted steering angle, such as the angle of the steering motor, as a function of time. The signal 230 is a SWA(t) representing the steering angle as a function of time. As described by the Equation (1), values of the steering angle 230 are based on values of a signal 210 of the angle of the steering motor shifted with an offset 250, e.g., the steering angle 230 is a sum of the angle of the steering motor and the offset.

The coherency of the SWAM 230 with a signal of the vehicle dynamic, e.g., a signal of the yaw rate 240 can be used to determine the offset. Specifically, an offset error 255 leads to an incorrect SWA(t) 220 that is incoherent with the signal 240 at least for some values, e.g., the values in the ranges 260 and 265. Thus, some embodiments use incoherence between the steering angle and VS to detect an incorrect value of the offset. According to Equation (1), by using the EMA sensor, incoherence can only be due to a wrong calculation of the offset O. This wrong calculation induces an offset error that is reflected in incoherence, of the steering angle and the lateral vehicle dynamics.

Figure 3:
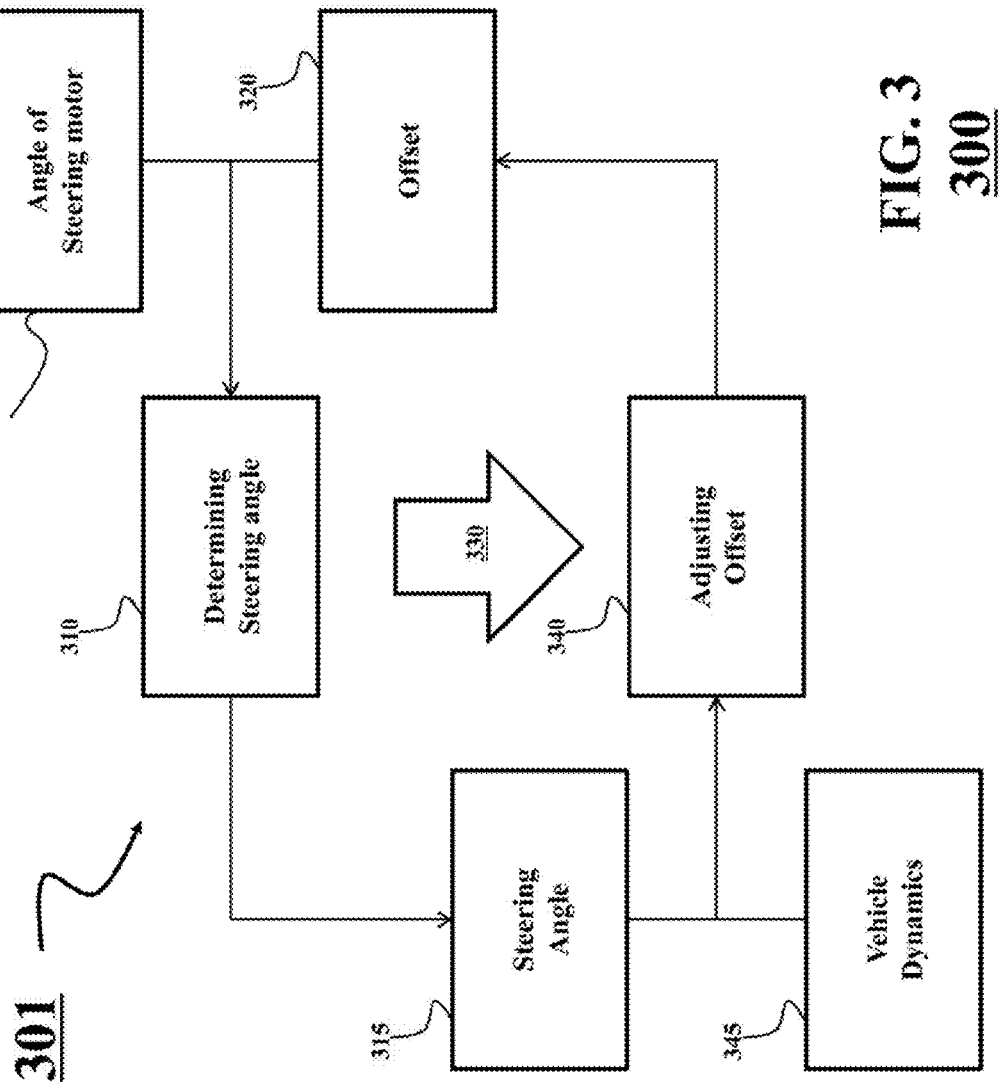
FIG. 3 is a diagram of a method for determining a steering angle of a steering column of a vehicle using the realization of FIG. 2.

FIG. 3 shows a diagram of a method 300 for determining a steering angle of a steering column of a vehicle using the realization of FIG. 2. The steps of the method can be performed by a processor 301. The method 300 determines 310 the steering angle 315 based on an angle of a steering motor 325 shifted with an offset 320. Next, the method updates 330 the steering angle by adjusting 340 the offset 320 in response to detecting incoherence between the steering angle 315 and a lateral vehicle dynamic 345. The method 300 can be performed iteratively until a termination condition is met.

Figure 4B:
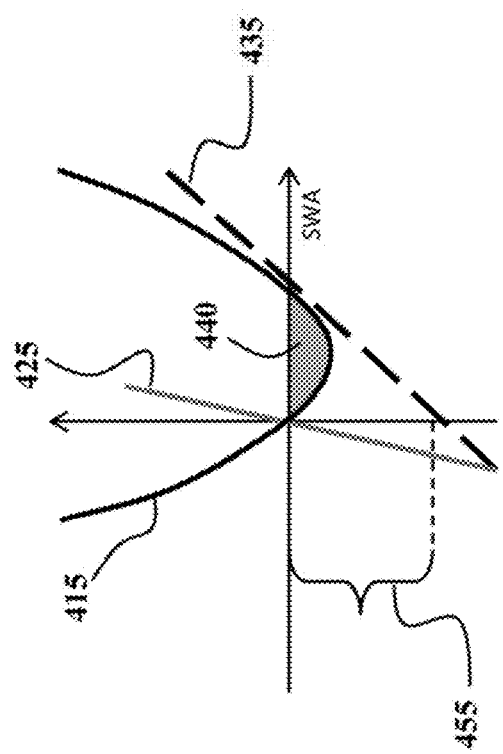
FIGS. 4A and 4B is an illustration of determining the incoherence based on a product of corresponding values of the steering angle and the lateral vehicle dynamics according to one embodiment of the invention.
Figure 4A:
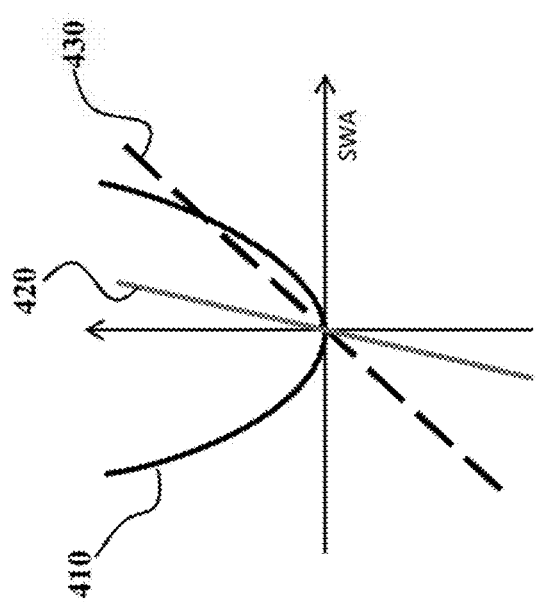

FIGS. 4A-4B graphically shows the incoherence based on a product of corresponding values of the steering angle and the lateral vehicle dynamics according to one embodiment of the invention. Specifically, some embodiments determine the product of each pair of values of the steering angles and value of VS determined concurrently during the movement of the motor vehicle, which allows to rapidly detect incoherence of the signals as soon the incoherence occurs. In addition, in one embodiment using the product, only one variable is used to detect incoherence, hence minimizing operations and the memory storage.

FIG. 4A shows an illustration of a product curve 410 of product of corresponding values of two coherent signals, such as VS signal 420 and SWA signal 430. The product 410 of corresponding values of two coherent signals is always positive.

FIG. 4B shows an illustration of a product curve 415 of corresponding values of two signals, such as VS signal 425 and SWA signal 435, which are incoherent due to an offset error 255. The product 415 is not always positive due to the region 440 where the incoherence occurs.

Figure 5:
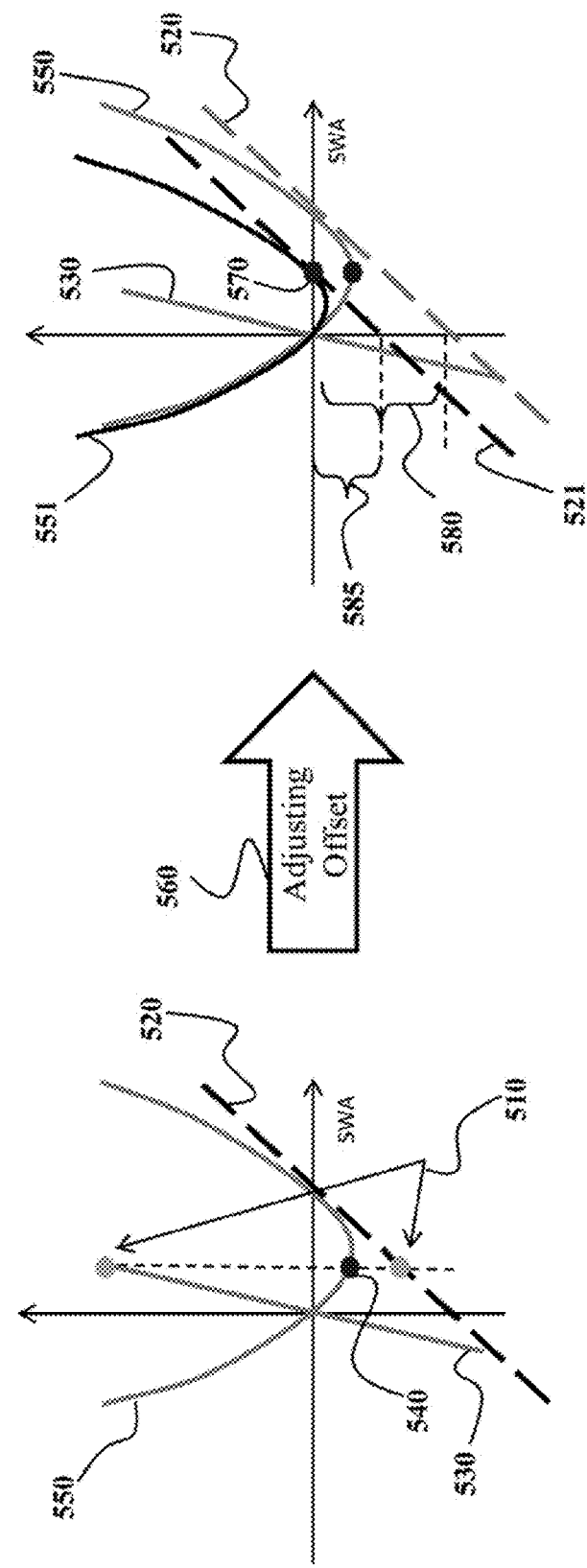
FIG. 5 are graphs showing adjusting the offset according to one embodiment of the invention.

FIG. 5 shows graphs for adjusting the offset in response to detecting the incoherence determined by a negative value of a product curve 550. The product curve 550 is formed by products of corresponding values of the steering angle 520 and the vehicle dynamic 530. The corresponding values 510 of the steering angle 520 and the vehicle dynamic 530 are determined concurrently, e.g., the measurements of those values are synchronized in time. In some embodiments, the measurements of the sensor are filtered with a low pass filter to remove the noise and to ensure that the signals are synchronized.

The product 540 of the values 510 is determined and if the product is negative, the offset is adjusted 560. In some embodiments, the old offset 580 is adjusted to determine a new offset 585, such that the value of the product 570 corresponding to the old value of the product 540 of the values 510 equals zero. In turn, the new offset 585 adjusts the steering angles from the steering angle 520 to a steering angle 521, which in turn adjust a product curve 551.

For example, the product ρ of the values of the steering angle and the vehicle dynamic can be determined according to $$\rho(t) = SWA(t) \cdot VS(t) \qquad (2)$$

and incoherence is detected when ρ<0. Advantageously, by testing the product of the values incoherence is detected by storing and operating on a single number, rather than by checking two values (SWA and VS).

When ρ<0 occurs, the offset calculation is updated by increasing/decreasing the offset such that the adjusted value causes the incoherence on the current values to disappear. The values which makes this possible is simply the value of the steering angle when incoherence is detected $$\Delta O(t) = -SWA(t)$$

$$O(t) = O(t^-) + \Delta O(t). \quad (3)$$

Thus the updated offset steering angle becomes 0, the product ρ=0, and hence incoherence for that pair of values is removed.

Some embodiments of the invention update the steering angle iteratively by repeating the incoherence detection and the adjustment of the steering angle offset until a termination condition is met. By repeating the adjustment process for a set of values, as contrasted with determining the steering angle once, possible errors due to incorrect determination of the driving conditions can be minimized. Also, the lateral vehicle dynamics at different points of time are different and, thus, effects of external disturbance can be reduced, which can further improve the determination of the steering angle.

Figure 6:
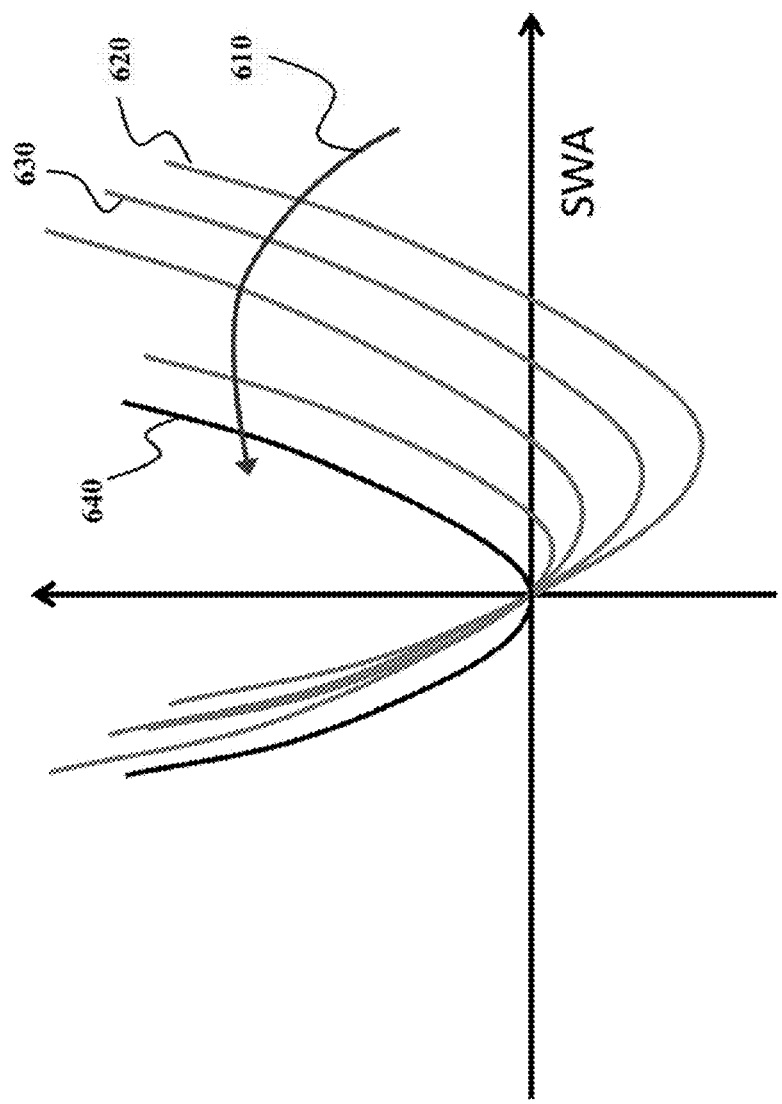
FIG. 6 is a graph of the iterative adjustment of the steering angle according to one embodiment of the invention.

FIG. 6 is a graph of the iterative adjustment of the steering angle offset. Because the offset is unique, every correction operated in a single value of steering angle affects all the other steering angle values in a positive way. For example, adjusting the steering angle corresponding to the product curve 620 in a direction of modification 610 adjusts not only the product of the specific values but the entire product curve 630, hence effectively reducing the steering angle estimation error. Thus, some embodiments continually improves the offset estimation and always reduces the error of the steering angle, by making smaller the region where incoherence occurs until the final product curve 640 corresponding to the final offset estimate is determined.

Figure 7:
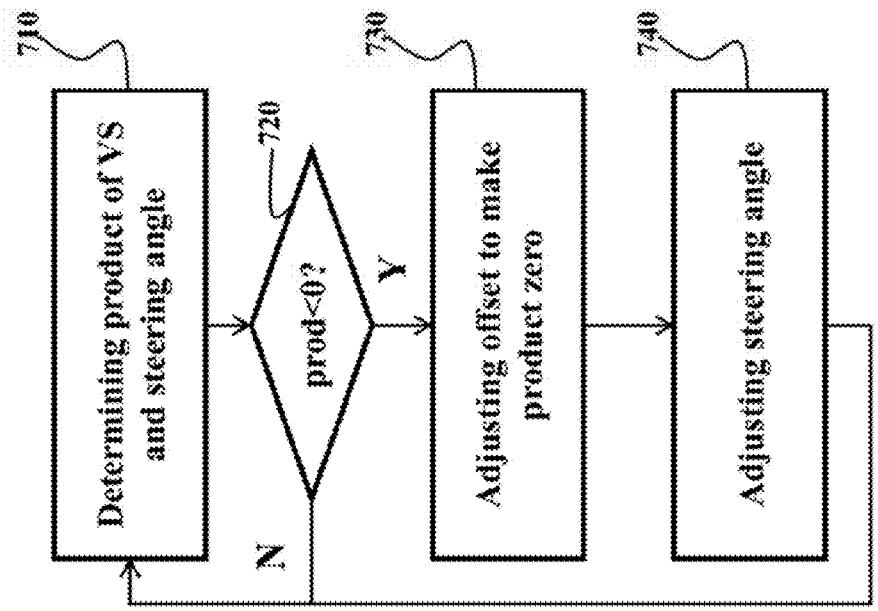
FIG. 7 is a flowchart of a method for adjusting the steering angle iteratively according to one embodiment of the invention.

FIG. 7 shows a flowchart of a method for adjusting the steering angle offset iteratively. A product of corresponding values of the steering angle and vehicle dynamic is determined 710. The steering angle can be initialized or be determined from a previous iteration. The sign of product is tested 720, and if the product is negative, then the offset is adjusted 730, e.g., to make the product zero, and the steering angle is adjusted 740 using the new offset estimate.

In effect, the abovementioned embodiments can adjust the offset when the vehicle is performing lateral movement, i.e., when the vehicle is turning. Hence, the requirement that the vehicle is driving straight no longer applies. This is beneficial because straight driving condition can be difficult to detect exactly, due to external effects such as road bank angle, rough surfaces, and a curved road. Hence, the embodiments can determine the steering angle more rapidly. Also, because the estimation of the offset and the steering angle can be performed in multiple driving conditions, the effect of external factors is reduced, because these factors affect only certain lateral vehicle dynamics, and because the embodiments can continue adjusting the estimate, iteratively, rather than performing a single calculation.

In contrast with a single estimation of the steering angle during the straight movement of the vehicle, some embodiments determine the steering angle iteratively, so that if an external disturbance occurs at one point in time and induces undesired effects, then these effects are reduced by subsequent iterations.

In addition, some embodiments are based on the realization that coherence is guaranteed in a certain low frequency bandwidth of the vehicle dynamics. Thus, steering angle and VS signals needs to be appropriately filtered by low pass filters to detect incoherence. This can require the use of synchronized filters which can be difficult and expensive to implement. Also, an incorrect selection of the frequencies of the low pass filter can reduce accuracy of the determination of the steering angle.

Accordingly, some embodiments perform a filtered offset update by determining the weighted average between the previous and current offset estimates. For example, one embodiment adjusting the offset with a product of the steering angle and a gain according to $$O(t) = \gamma O(t) + (1-\gamma)O(t^-) = O(t^-) + \gamma \Delta O(t) \quad (4)$$

where $0 < \gamma \leq 1$. Thus, the filtered offset update is obtained by multiplying the correction $\Delta O$ (which is equal to the steering angle when incoherence is detected, see Equation (3)) by a filtering gain γ.

Figure 8:
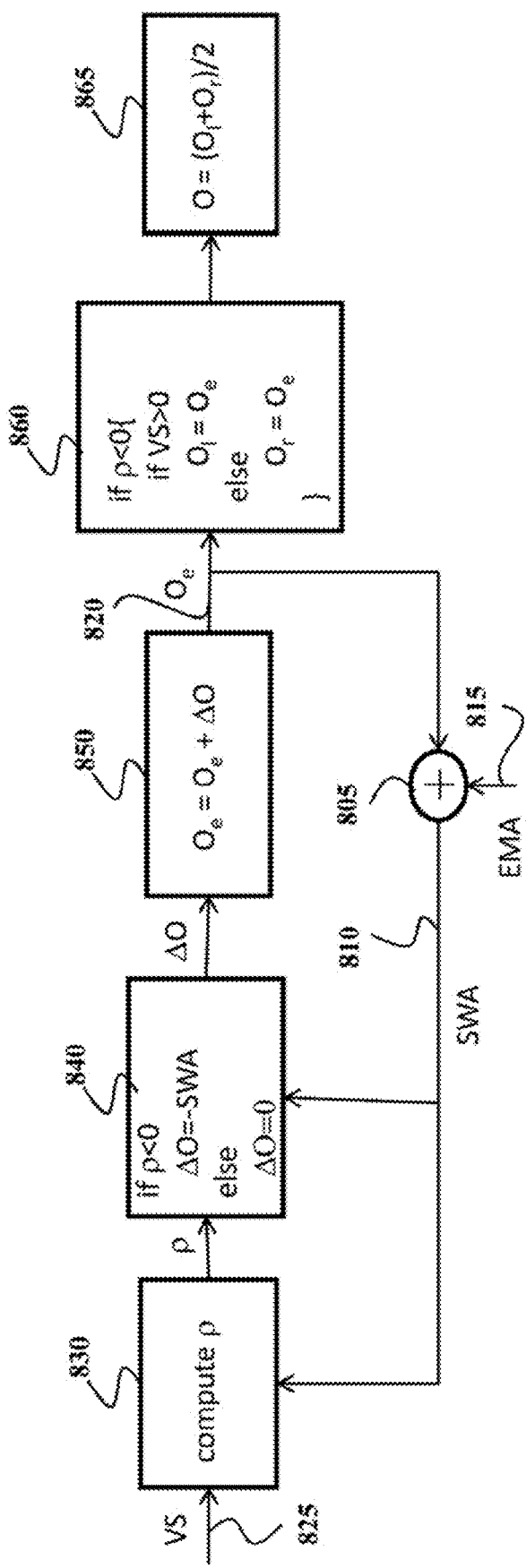
FIG. 8 is a block diagram of a method complementing a method of FIG. 7 with a dynamic filtering algorithm iteratively adjusting the offset with a filtering gain according to one embodiment of the invention.

FIG. 8 shows a block diagram of a method complementing a method of FIG. 7 with a dynamic filtering algorithm iteratively adjusting the offset with a filtering gain. The steering angle 810 is determined as a sum 805 of an angle of a steering motor 815 and an offset 820. In one embodiment, the offset 820 is initialized, e.g., with a current value of the steering angle.

The steering angle 810 is multiplied 830 with a vehicle dynamic 825 to determine a product ρ. If the product is negative 840 the offset is adjusted 850 with a product of the steering angle and a filtering gain. The larger the filtering gain, the faster is the convergence and the larger the impact of external events, the smaller the filtering gain the slower the convergence and the smaller the impact of external disturbances. Thus, one embodiment updates the gain γ according to the difference equation $$\alpha(k+1) = c \cdot \alpha(k) + (1-c)\beta;$$

$$\gamma(k) = \alpha(k) \quad (5)$$

wherein k, α, β and c are positive coefficients. In some embodiments, the coefficient $\alpha(0)$ is set close to 1, the coefficient β is set close to 0, and the coefficient c is between 0 and 1 to limit the gain for very large k, $\alpha(k)=\beta$.

Some embodiments of the invention are based on a realization that the possible errors in estimation due to inappropriate signal filtering have apposite signs on left and right turns due to the symmetry of vehicle dynamics. Thus, some embodiments determine 860 two separated values for the offset in order to further reduce the impact of incorrect filtering. A first offset $O_l$ corresponds to the positive value of VS after the incoherence is detected (e.g., left turns). A second offset $O_r$ corresponds to negative or zero values of the, VS≤0, (e.g., right turns). The value of the offset is determined 865 based on estimates of the offsets of the steering angle obtained from left and right turn separately. For example, one embodiment determines an average value of the left and right offsets according to $$O = \frac{O_l + O_r}{2}. \quad (6)$$

Some other embodiments of the invention are based on a realization that external disturbances affect the different VS in different ways. For example the road bank angle can have opposite effects in the lateral acceleration and steering alignment torque. If the lateral acceleration is increased by the presence of the road bank angle, thus indicating a yaw rate higher than what would be experienced on a flat road, the steering alignment torque is reduced, thus indicating a torque lower than what would be experienced in a flat road. Thus, while the hank is present, the determination of the steering angle based on the lateral acceleration can generate an offset larger than a true offset, but the determination of the steering angle based on alignment torque can generate an offset lower than the true offset. Thus, some embodiments performs the determination of the steering angle multiple times from the same SWA value but different VS values obtained from different vehicle dynamics, and take as final estimate the weighted average of MI the estimates, e.g., using the process of convex sensor fusion.

Figure 9:
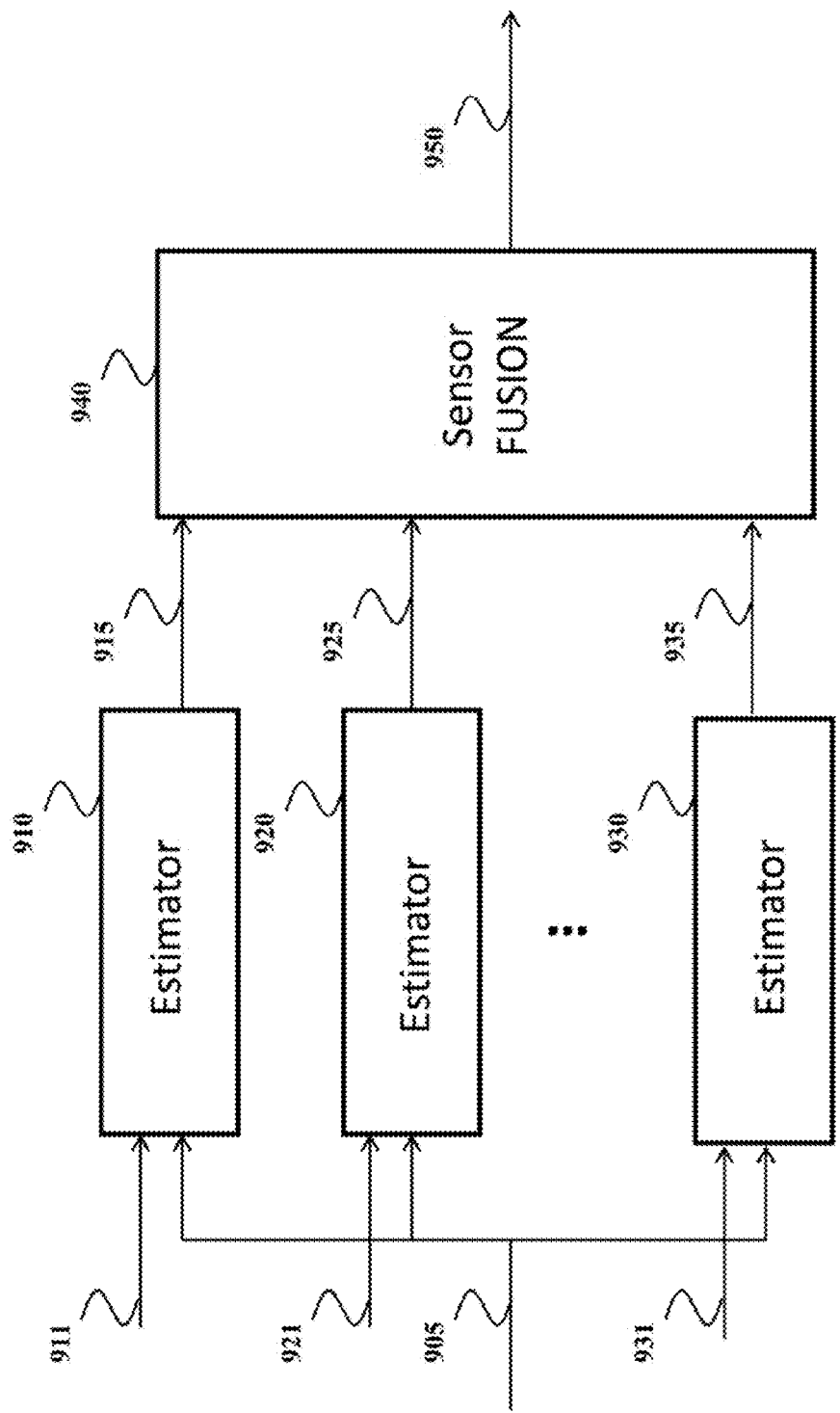
FIG. 9 is a block diagram of a sensor fusion method according to some embodiments.

FIG. 9 shows a block diagram of a sensor fusion method according to some embodiments. Multiple estimators 910, 920, 930 of the offset are executed in parallel, all using the same angle of the steering motor 905, hut different vehicle dynamics. For example, the vehicle dynamic of the estimator 910 is the yaw rate 911. The vehicle dynamic of the estimator 920 is the lateral acceleration 921. The vehicle dynamic of the estimator 930 is the steering alignment torque 931. Accordingly, different estimators determine different offsets, e.g., 915, 925, and 935. Each estimator can employ any steering angle offsets determination method described above.

The final offset 950 is determined 940 as a combination of all the different offsets. For example, one embodiment determines the offset 950 according to $$O(t) = \sum_{i=1}^{N} w_i O^{(i)}(i), 0 \le w_i \le 1, \sum_{i=1}^{N} w_i = 1. \quad (7)$$

Due to the nature of the determining the steering angle by adjusting the angle of the steering motor with offset according to Equation (1), the steering angle offset is a constant. Thus, after the offset is correctly determined, no incoherence should occur, if not due to external unpredictable effects. Thus, some embodiments test the correctness of the offset and the steering angle by comparing the current offset with an average of the offset ($\overline{O}$) over some time in the past $$\overline{O}(t) = \frac{1}{t_0} \int_{t-t_o}^{t} O(\tau) d\tau \quad (8)$$

wherein $t_0$ is the span of the time interval for determining the average of the offset ($\overline{O}$).

The variance of the offset ($O_v$) in such interval can be determined according to $$O_v(t) = \frac{1}{t_0} \int_{t-t_o}^{t} (O(\tau) - \overline{O}(t))^2 d\tau. \quad (9)$$

Figure 10:
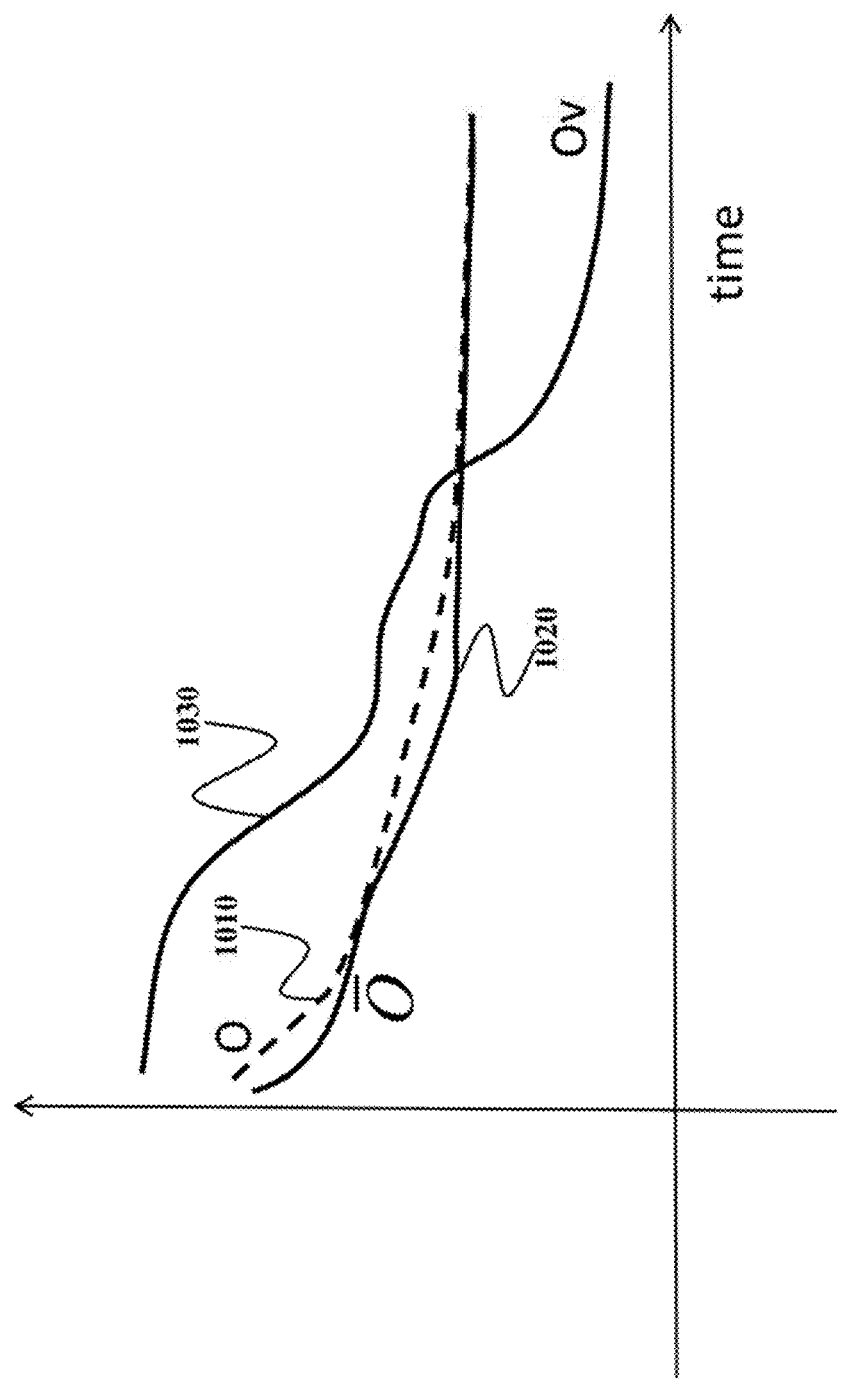
FIG. 10 is a graph of the offset estimate, time-average of the offset estimate, and variance of the offset estimate over time.

Then, termination condition can be tested according to $$O_v(t) < \epsilon_v, |O(t) - \overline{O}(t)| < \epsilon_m, \quad (10)$$

where the positive constants $\epsilon_v$, $\epsilon_m$, that are the tolerances on variance and mean error, are set arbitrarily depending on the desired termination precision, FIG. 10 is graph illustrating convergence of the offset 1010, the average of the offset 1020 and the variance 1030 of the changing of the offset 1010 over time. In some embodiments, the threshold on average difference and the threshold in covariance in Equation (10) are set to 0. When the termination condition is achieved, the offset estimate is stopped, and the current value of the offset is stored in permanent memory until the primary energy source of the vehicle electrical system becomes inactive.

Figure 11:
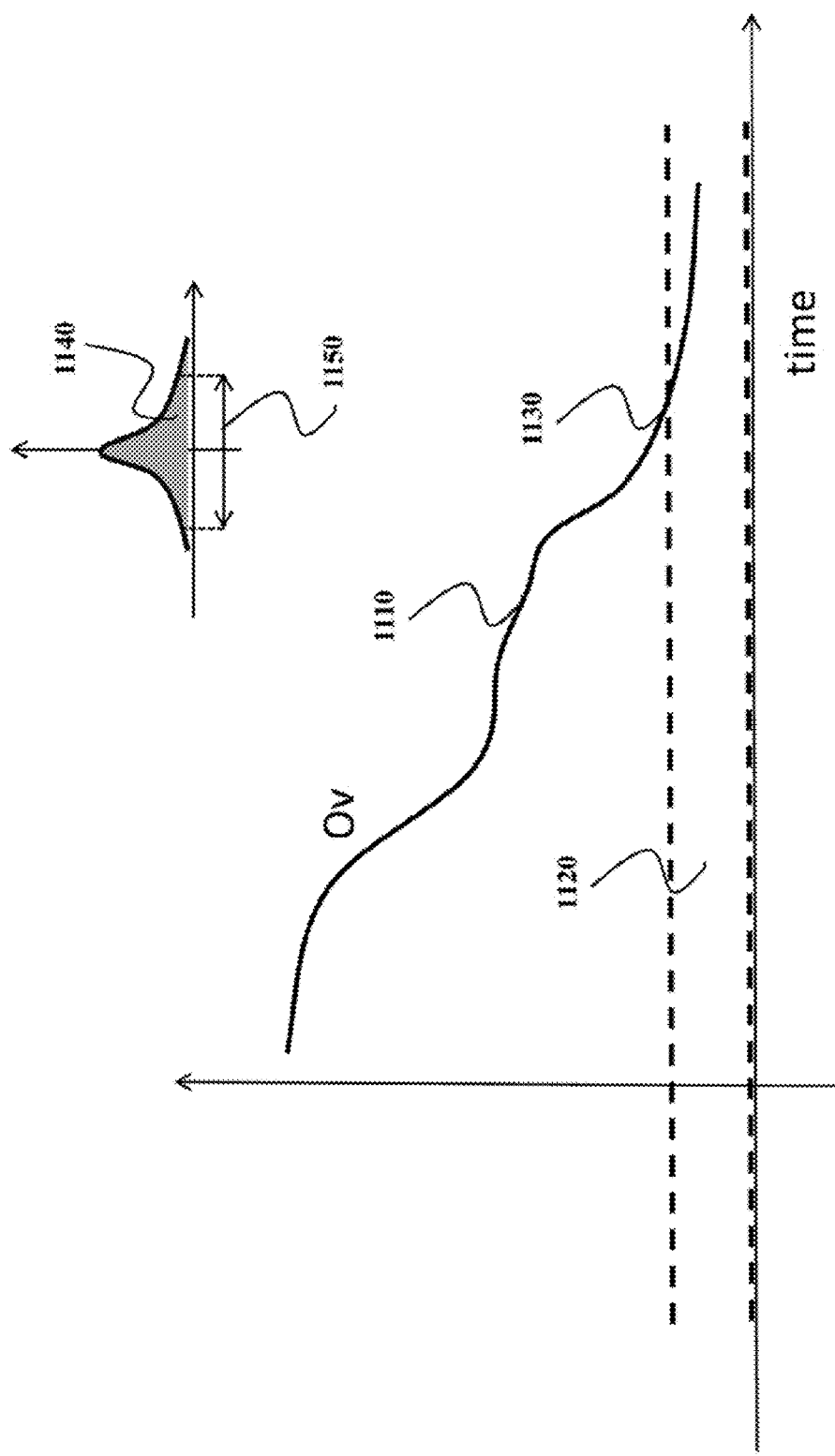
FIG. 11 is a graph illustrating determination of a termination condition based on a desired estimate confidence interval according to one embodiment of the invention.

FIG. 11 is a graph that shows how in some embodiments, $\epsilon_v$, $\epsilon_m$, are set according, to confidence interval tables assuming a specific distribution for O at steady state (for instance, Gaussian), in order to ensure that the offset error is bounded within desired values, with at least a certain probability. For example, at time 1130, when the difference between offset estimate and mean is 0 and the covariance 1110 enters the region of termination 1120, which is defined according to the confidence interval 1150 on the assumed offset estimate distribution 1140 that guarantees that the error in the offset estimation is below a certain value, with al least a requested predetermined probability, the estimation is terminated. In such manner, the error of the offset is bounded by a predetermined value with a predetermined probability.

Accordingly, some embodiments determine the first and the second threshold using the confidence interval 1150 of a distribution 1140 of an error of the offset corresponding to a predetermined probability, such that the variance 1110 and the average of the offset satisfying the first and the second threshold guarantee that the error of the offset is smaller than a desired value with the predetermined probability.

Some embodiments determine the average and variance in a memory efficient way using exponentially decaying filters in discrete time sampling step n, the average and variance are determined according to $$\overline{O}(n) = (1 - \varphi) \cdot \overline{O}(n-1) + \varphi O(n), \quad (11)$$

$$O_v(n) = \frac{1-2\varphi}{1-\varphi} \cdot O_v(n-1) + \frac{1-2\varphi}{1-\varphi} \cdot (\overline{O}(n-1) - O(n))(\overline{O}(n) - O(n)),$$

wherein φ is the exponentially decaying gain. Computing the average and the variance according to Equation (11) reduces the storage requirement, because the computation according to Equations (8), (9) requires the storage of all data over the span of the time window.

Figure 12:
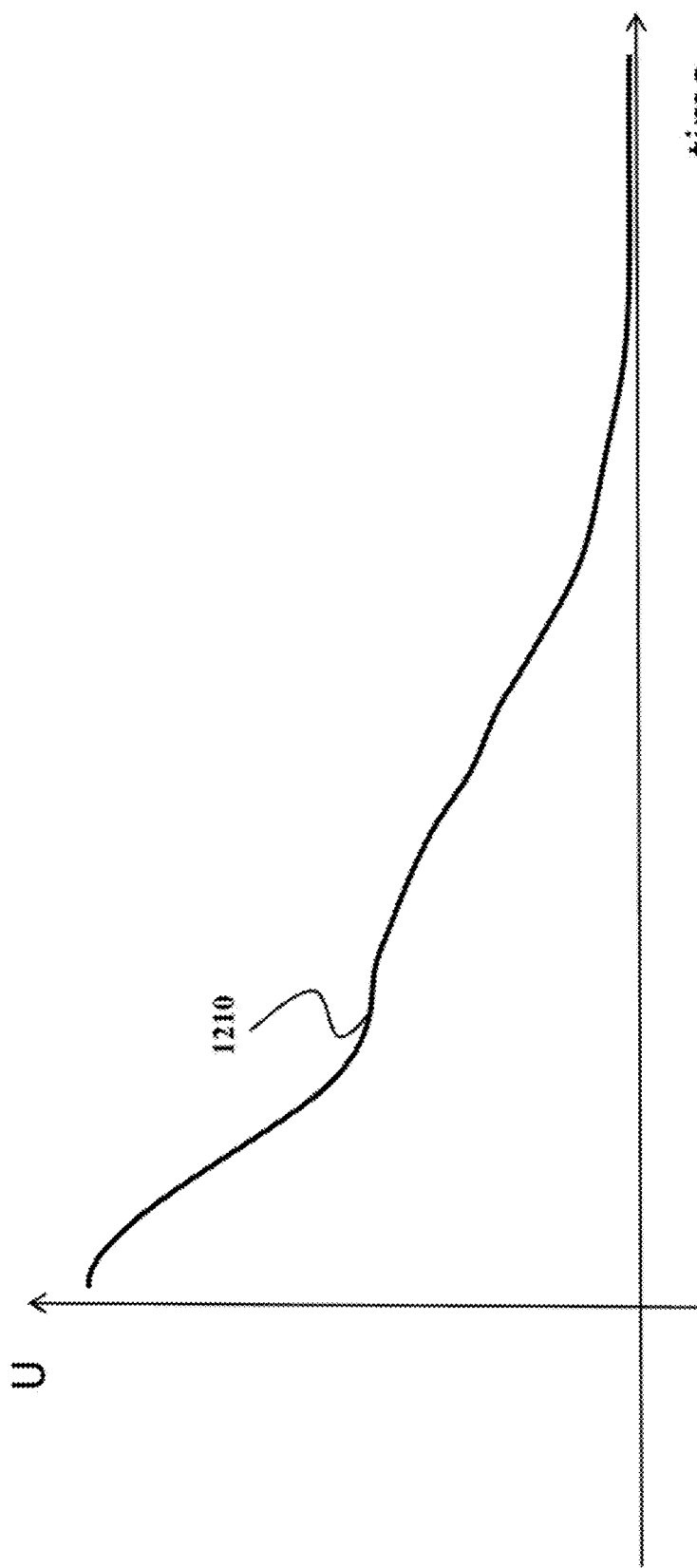
FIG. 12 is a graph showing an uncertainty in the current value of the steering angle.

FIG. 12 shows a graph illustrating that the variance and average difference measures can be used to assess the uncertainty in the current value of the steering angle. The overall uncertainty U 1210 of the steering angle knowledge can be expressed as $$U(t) = \sigma_v O_v(t) + \sigma_m |O(t) - \overline{O}(t)| + \sigma_s |O_l(t) - O_r(t)|, \quad (12)$$

where $\sigma_v$, $\sigma_m$, $\sigma_s$ are values greater or equal to 0. The value $U(t)=0$ indicates no uncertainty, since variance has to be 0, difference between average and current value has to be 0, and difference in estimation between left and right turns has to be 0. This indicates that no external effects affect the accuracy of the estimate.

The above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers. Such processors can be implemented as integrated circuits, with one or more processors in an integrated circuit component. Though, a processor can be implemented using circuitry in any suitable format.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, the invention can be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions can be in many forms, such as program modules, executed by one or more computers or other devices. Generally, program modules include routines, programs, objects, components, data structures that perform particular tasks or implement particular abstract data types. Typically the functionality of the program modules can be combined or distributed as desired in various embodiments.

Also, the embodiments of the invention can be embodied as a method, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for determining a steering angle of a steering column of a vehicle, comprising:
   determining the steering angle as a sum of a shifted steering angle and an offset; and
   updating the steering angle by adjusting the offset in response to detecting an incoherence between the steering angle and a lateral vehicle dynamic, wherein the incoherence results in a negative value of a product of corresponding values of the steering angle and the lateral vehicle dynamic, wherein steps of the method are performed by a processor.

2. The method of claim 1, wherein the lateral vehicle dynamic includes at least one of a yaw rate, a lateral acceleration, a steering alignment torque, a steering torque, and a rotational speed of at least one wheel of the vehicle, and wherein the shifted steering angle includes at least one of an angle of a steering motor, a relative angle measured with respect to the steering angle, a value of the steering angle determined in a presence of an error, and an effective steering wheel angle shifted by the offset.

3. The method of claim 2, further comprising:
   determining the lateral vehicle dynamic by low pass filtering a measurement of a vehicle sensor.

4. The method of claim 1, further comprising:
   detecting the incoherence in response to determining the negative value of the product of corresponding values of the steering angle and the lateral vehicle dynamic.

5. The method of claim 4, further comprising:
   adjusting the offset to make the product nonnegative.

6. The method of claim 5, further comprising:
   repeating the detecting and the adjusting for a set of values of the steering angle and a set of values of the vehicle dynamics until a termination condition is met.

7. The method of claim 1, further comprising:
   adjusting the offset with a product of the steering angle and a filtering gain.

8. The method of claim 7, further comprising:
   initializing the filtering gain by $\alpha(0)$, such that $0<\alpha(0)<1$; and
   decreasing the gain for each iteration until a termination condition is met, such that a final gain $\beta$ is $0<\beta<\alpha(0)$.

9. The method of claim 1, further comprising:
   initializing the steering angle;
   determining a plurality of estimations of the steering angle, wherein each estimation is coherent with a corresponding lateral vehicle dynamic; and
   adjusting the steering angle as a weighted average of the plurality of estimations of steering angle.

10. The method of claim 1, further comprising:
    initializing the steering angle;
    determining a left estimation of steering angle for a left turn of the steering wheel;
    determining a right estimation of steering angle for a right turn of the steering wheel; and
    determining the steering angle as an average of the left and right estimations.

11. The method of claim 1, further comprising:
    adjusting the offset iteratively until a difference between the offset and an average value of the offset over a period of time is below a first threshold, and/or a variance of the offset over the period of time is below a second threshold.

12. The method of claim 11, further comprising:
    determining the average value of the offset and the variance of the offset using an exponentially decaying filter.

13. The method of claim 11, further comprising:
    determining the first and the second threshold using a confidence interval of a distribution of an error of the offset corresponding to a predetermined probability, such that the variance and the average of the offset satisfying the first and the second threshold guarantee that the error of the offset is smaller than a desired value with the predetermined probability.

14. The method of claim 1, further comprising
    determining an uncertainty of the steering angle based on a difference between the offset and a variance of the offset over a period of time; and
    adjusting the offset iteratively until the uncertainty of the steering angle equals zero.

15. The method of claim 14, further comprising:
    determining the uncertainty of the steering angle based on a difference between offsets separately determined from left and right turns of the vehicle.

16. The method of claim 14, further comprising:
    determining the uncertainty of the steering angle based on a difference between offsets separately determined for different lateral vehicle dynamics.

17. A system for determining a steering angle of a steering column of a vehicle, comprising a processor for:
    determining the steering angle as a sum of a shifted steering angle and an offset; and for
    updating the steering angle by adjusting the offset in response to detecting an incoherence between the steering angle and a lateral vehicle dynamic, wherein the incoherence results in a negative value of a product of corresponding values of the steering angle and the lateral vehicle dynamic.

18. A motor vehicle, comprising:
- at least one sensor for measuring at least one lateral vehicle dynamic of the motor vehicle;
- a sensor for measuring a signal representing a shifted steering angle; and
- a processor for determining a steering angle of a steering column of the motor vehicle as a sum of a shifted steering angle and an offset, and for adjusting iteratively the steering angle in response to detecting an incoherence between the steering angle and the lateral vehicle dynamic, wherein the incoherence results in a negative value of a product of corresponding values of the steering angle and the lateral vehicle dynamic.

19. The motor vehicle of claim 18, wherein the signal represents an angle of a steering motor of an electric power steering system, and wherein the sensor is a steering motor sensor for measuring an angle of the steering motor.

20. The motor vehicle of claim 18, wherein the sensor is a relative encoder for measuring the signal representing an angle with respect to the steering angle.

* * * * *